Nov. 15, 1932.  K. IMHOFF  1,887,490

METHOD OF AND APPARATUS FOR THE TREATMENT OF SLUDGE, SEWAGE, AND THE LIKE

Filed March 14, 1932

INVENTOR—
Karl Imhoff
BY C. P. Goepel,
his ATTORNEY—

Patented Nov. 15, 1932

1,887,490

UNITED STATES PATENT OFFICE

KARL IMHOFF, OF ESSEN, GERMANY

METHOD OF AND APPARATUS FOR THE TREATMENT OF SLUDGE, SEWAGE, AND THE LIKE

Application filed March 14, 1932. Serial No. 598,619.

My invention relates to improvements in apparatus for the treatment of sludge, sewage, and the like. More particularly my invention relates to apparatus for the heat treatment of sewage and other material containing sludge, silt, sediment, slime, and the like, or organic putrescible matter in sedimentation, sewage tanks, or basins. Furthermore, the invention applies to improvements in apparatus for digesting organic matter in sewage.

Digesting or other types of tanks or basins for the treatment of sewage or other materials are generally provided with heating pipes fixed onto the walls of the tanks and also onto the bottom thereof. In the case of large tanks or basins, the amount of piping required in the tank for effectively heating the sewage material in the chamber would be very great, thus involving considerable expense for the construction and maintenance thereof. Furthermore, the piping in the chamber being fixed to the walls of the tank eventually accumulate mud or other sediment around them and cake thereon. The accumulation of sediment or sludge on the pipe due to the action of heat of the pipe may cause the sediment to harden so that a scale is formed thereon. Under such conditions there is a very poor heat transfer from the heat medium passing through the pipe, into the sewage or digestable mass.

It is an object of my invention, therefore, to obviate the above-mentioned disadvantages and defects for the treatment or digestion of sewage and the like.

Another object of my invention is to provide apparatus for the treatment of sewage or other material in which matter suspended in the liquid of the sewage is thoroughly agitated and uniformly heated to aid digestion of the mass in a sewage tank and the like, and also to prevent the accumulation of sedimentary material and caking thereof in the tank.

With the above and other objects and features in view, my invention generally described includes a tank or basin in which is treated a sewage or other mass. A rotary shaft having a hollow top end portion is vertically disposed in the tank and is provided with stirring members. One of the stirring members is submerged in the mass at the lower portion of the tank, while the other stirring member is connected with the upper portion of the shaft but within the tank, to agitate the surface of the sewage mass and mix the scum formed on top thereof during digestion with the liquid mass and to aid the introduction of aerobic bacteria into the mass for putrefaction. The bottom face of the lower stirring member is provided with depending flanges or scraping blades for removing sediment and the like from the floor of the tank. The hollow end portion of the shaft extends above the roof of the tank and is provided with inlet and outlet conduits in connection with heating tubes extending radially on the lower stirring member. The heating tubes with the stirring member form stirring and agitating means for thoroughly treating the mass in the tank. The shaft in the embodiment as preferably disclosed herein, extends outside of the tank and is maintained in vertical position by means of bushing collars fixed on top of the tank. The collars are fixed to a cylindrical casing and are provided with annular passages which are in communication with the conduits in the shaft and also with supply pipes connected with heating means for the passage of fluid through the collars to and from the heating tubes.

The invention further consists in the new and novel features of the construction and the new and original arrangement and combination of parts hereinafter described and more particularly set forth in the appended claims.

In the accompanying drawing:—

Similar reference characters designate corresponding parts throughout the drawing.

Figure 1:
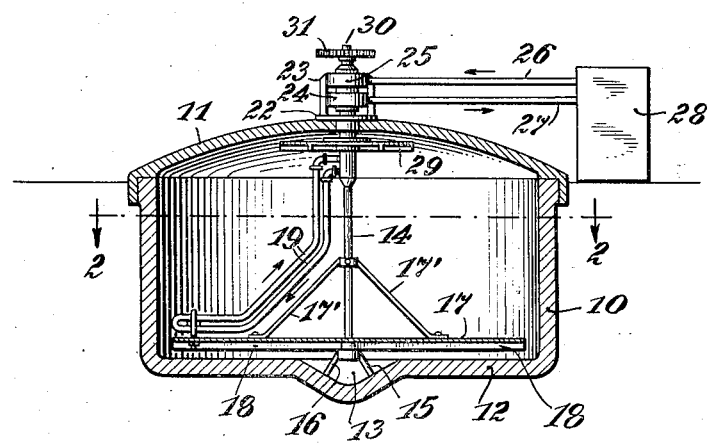
Figure 1 is a sectional elevation of a basin or tank with the preferred embodiment of the invention arranged therein.
Figures 2, 3:
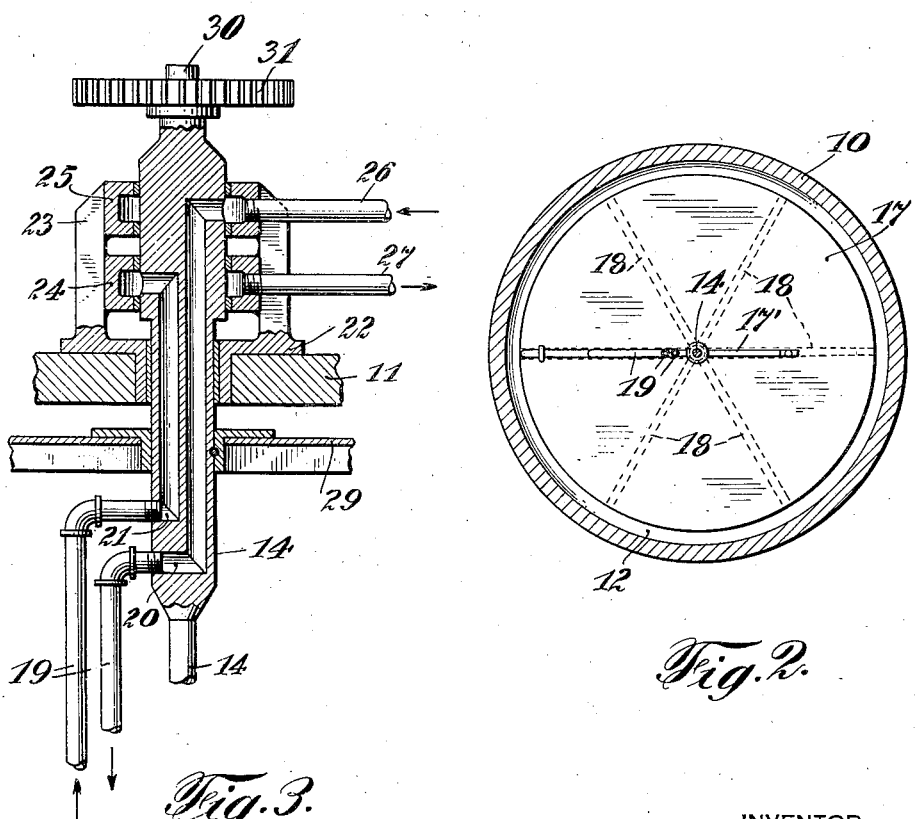
Fig. 2 is a plan view taken on line 2—2 of Fig. 1.
Fig. 3 is an enlarged detail sectional view of the shaft at the top of the basin or tank for conducting heating fluid toward or from the bottom thereof.

Referring in detail to the drawing, wherein I have shown for the sake of clarity and illustration one simple and practical embodiment of my invention, a sewage, sedimentation tank or basin 10 for sludge, sand, slime, silt, mud or organic material in suspension, having a cover 11 of desired cross section and strength, is provided at the bottom or flooring 12 thereof with a V-shaped recess or other depression 13 forming a discharge outlet for drawing off treated sewage material and sediment scraped from the bottom of the tank. Vertically located within the tank 10 and at its center is a rotary shaft 14 with its lower end resting on base members 15 and 16 on the floor of discharge outlet 13. The upper part of the shaft is of somewhat greater diameter and extends out from the roof of the tank. The shaft 14 carries a supporting disk or stirrer 17 whose underside carries a plurality of blades 18 angularly projecting therefrom for scraping mud from the bottom of the tank. The outer peripheral portion of the stirrer 17 is maintained in rigidly flat position with respect to the shaft 14 by means of link members 17'. The blades 18 may be radially disposed on the underface of the stirrer 17 or they may curve from the periphery of the disk to the center thereof so as to bring the sediment toward the center of the tank and into the discharge outlet 13. Such blades are also very useful when the liquid portion of the sewage is drawn off and only the slushy sediment remains in the tank.

In many cases where stirrers with scraping blades are not provided there is a tendency for mud, silt, sediment, or sludge to deposit and form superposed layers which eventually cake together due to long standing and also because of the pressure of the superposed layers of the sediment. Furthermore, if pipes are placed on the floor of the tank the sedimentary material accumulates on the piping, forming a thick scale or layer around the piping and preventing proper heat transfer into the sewage mass proper. In order to obviate this disadvantage the top face of the disk 17 is provided with heating tubes 19 which are carried thereon. Each heating pipe or tube 19 is bent over itself so that its outlet and inlet ends are above each other and the tube proper rests radially on stirring disks 17. The tube extends upwardly from the face of the stirrer 17 along the link members 17' and upward onto the rotary shaft 14 leading into a hollow portion of the rotary shaft. The upper part of shaft 14 is provided with the inlet duct 20 and an outlet duct 21 to which are connected the respective ends of the tube 19 for the passage of hot water into and from pipe 19.

The upper part of the rotary shaft 14 is maintained in vertical position inside of the tank by means of a bearing plate 22 fixed into the top wall 11 of the tank 10. The top of the bearing plate 22 is flanged and provides a base support for a cylindrical casing 23 having annular packing, sealing rings 24 and 25 superposed above each other for retaining shaft 14 during rotation in vertical alignment. The packing rings 24 and 25 are each provided with a circular or annular groove surrounding the shaft and are in alignment with the openings of the inlet and outlet ducts thereof for the passage of hot water or other heating medium into the conduits or ducts 20 and 21. It is to be noted that the packing rings 24 and 25 prevent the leakage of the heated fluid from the conduits.

Connected with the sealing rings 24 and 25 respectively are the pipes or conduits 26 and 27 leading into the casing 23 from a heater 28. It will be noted that the hot fluid passes from the heater 28 through pipe 26 into the sealing ring 25 through bore 22 of the shaft 14 into pipe 19. The fluid therein after having transferred its heat into the mass in the tank passes from the pipe back through the bore 21 of the shaft into the sealing ring 24 and back to heater 28, by means of pipe 27. By such construction it will be noted that there is continuous passage of the heating medium through pipe 19 for maintaining the proper temperature condition of the sewage mass to aid digestion and putrefaction.

The shaft 14 has a stirrer 29 at the top portion thereof, but beneath the cover 11, in order to agitate the scum or frothy material on the surface and permit exposure of the liquid to air or other medium carrying digesting bacteria. The protruding top 30 of the shaft 14 is also provided with a gear wheel 31 or other means for receiving energy to rotate the shaft 14 and stirrers 17 and 29, thus keeping the pipes 19 in constant movement within the sewage chamber or tank. By constant rotation of the stirrer 17 and pipes 19 there is no tendency for sediment or other muddy material to accumulate on the pipe to reduce its efficiency in aiding putrefaction and fermentation or for preventing caking of the sediment at the bottom thereof.

From the foregoing description of a preferred embodiment of my invention, taken in connection with the accompanying drawing, it is apparent that I have provided an efficient rotary device for aiding in the digestion of sludge or other suspended material in sewage mass and also for removing sediment or other deposited material from the bottom of sewage tanks, basins, and the like. Furthermore, I also provide means for maintaining constant and uniform temperature ranges in the sewage mass in the tank for facilitating the digestion of the sewage material in cooperation with aerobic bacteria. One further advantage of my invention in its preferred embodiment is that less piping is required for heating sedimentation tanks and the like than piping now commonly used.

While one embodiment of the invention in its preferred form has been described, it is to be understood that the invention is not limited to such embodiment, but that changes as to arrangement, form, construction, and material may be made without departing from the spirit and scope of my invention as defined in the herein appended claims.

I claim:—

1. In a sewage or digesting tank, the improvement comprising a centrally disposed rotary shaft in the tank, a circumferential stirrer on the shaft and submerged in the tank for agitating the bottom of the sewage mass therein, heating tubes extending from the shaft onto the stirrer and carried thereon, and conduit means at the upper part of the shaft for conducting hot fluids through said tubes.

2. In a sewage or digesting tank, the improvement consisting of a vertically disposed shaft in the center of the tank having inlet and outlet conduits at the upper portion thereof for the passage of hot fluids therethrough, a disk-like stirrer engaged to said shaft and submerged at the lower part of said tank, scraping means angularly projecting from the bottom face of said stirrer for scraping sedimentary material from the bottom of the tank, and heating tubes in connection with said conduits and carried by said stirrer for aiding digestion of the material in the tank.

3. In combination with a sewage tank, a rotary shaft in the tank, a stirring member on the shaft and submerged in the lower part of the tank, and heating tubes carried by said stirring member and in connection with said shaft for warming and digesting sewage material in the tank during the rotation of the stirring member thereof, said tubes conducting a heating medium therethrough.

4. In combination with a digestion or sewage tank, a vertical rotary shaft in the tank, a stirrer in connection with said shaft and submerged in the lower part of the tank, heat transfer units carried by said stirrer and extending radially from the shaft onto said stirrer for being rotated through the fluid sewage or digesting mass in the tank, means on the shaft and in connection with said heat transfer units for permitting the passage of the heating medium into and out of the heating units.

5. In a sewage or digesting tank for digesting waste liquids containing putrescible organic matter, the improvement comprising a rotary shaft vertically located in said tank, a stirrer on said shaft and submerged at the bottom portion of the tank, for disturbing the sedimentary material therein, another stirrer engaged to the top portion of the shaft for removing and agitating scum forming on the surface of the digesting liquid materials in the tank, heating conduits engaged to said shaft and extending radially onto the first stirrer for digesting the sewage mass and movable therethrough on rotation of the shaft, and means on the shaft in connection with the heating conduits for the passage of hot and spent fluids through the conduits.

6. In a digesting or sewage tank for digesting waste liquids containing putrescible matter, the improvement comprising a rotatable shaft disposed vertically within the tank and having its upper portion provided with inlet and outlet conduits, a stirring disk engaged to the shaft and submerged in the tank at the lower portion thereof, heating tubes in connection with the conduits on the shaft, and extending radially onto the disk, each of said tubes being bent over upon itself forming a continuous passage for the heating fluid whereby to digest the sewage mass while agitating the same, a bearing collar on the shaft outside the tank provided with annular passages in connection with the conduits on the shaft, and means for feeding and drawing off the heating fluid from the collar.

In testimony that I claim the foregoing as my invention, I have signed my name hereto.

KARL IMHOFF.